United States Patent
Haka

(10) Patent No.: US 7,100,472 B2
(45) Date of Patent: Sep. 5, 2006

(54) TWO SPEED TRANSFER CASE HAVING TWO TRANSFER CHAINS

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 97 days.

(21) Appl. No.: 10/807,832

(22) Filed: Mar. 24, 2004

(65) Prior Publication Data

US 2005/0211015 A1 Sep. 29, 2005

(51) Int. Cl.
*F16H 9/24* (2006.01)
(52) U.S. Cl. .................... 74/665 GE; 474/73; 180/251
(58) Field of Classification Search ............. 74/665 F, 74/665 GE, 665 GA, 665 T; 192/53 F; 180/251, 180/247, 233; 474/144, 148, 73; 475/198, 475/206
See application file for complete search history.

(56) References Cited

U.S. PATENT DOCUMENTS

| | | | | |
|---|---|---|---|---|
| 570,015 A | * | 10/1896 | Hall | ............................ 474/73 |
| 575,725 A | * | 1/1897 | Meister | ........................ 474/73 |
| 4,349,091 A | | 9/1982 | Miyake et al. | ............ 192/53 F |
| 5,492,349 A | * | 2/1996 | Ferez | ........................... 474/73 |
| 5,954,612 A | * | 9/1999 | Baxter, Jr. | .................. 475/198 |
| 6,830,142 B1 | * | 12/2004 | Weilant | .................... 192/84.92 |
| 2005/0215377 A1 | * | 9/2005 | Haka | .......................... 475/210 |

* cited by examiner

*Primary Examiner*—Sherry Estremsky
(74) *Attorney, Agent, or Firm*—Christopher DeVries

(57) ABSTRACT

A transfer case is provided for a vehicle having front and rear axles. The transfer case includes first and second input clutches connected with an input member, and first and second transfer chains having different chain ratios operably connectable between the input member and the front and rear axles. A four wheel drive clutch is connected between one of the transfer chains and one of the axles. The first and second input clutches and the four wheel drive clutch are selectively engageable to provide two wheel drive high and low ratios, and four wheel drive high and low ratios.

19 Claims, 2 Drawing Sheets

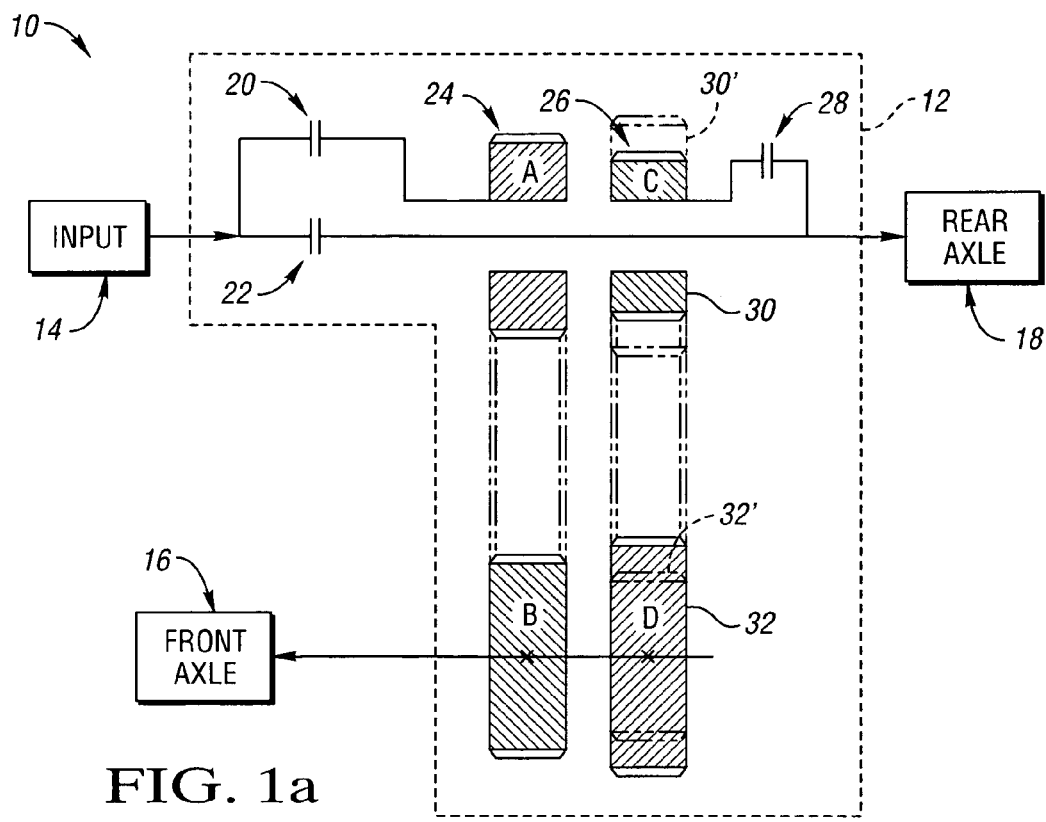
FIG. 1a
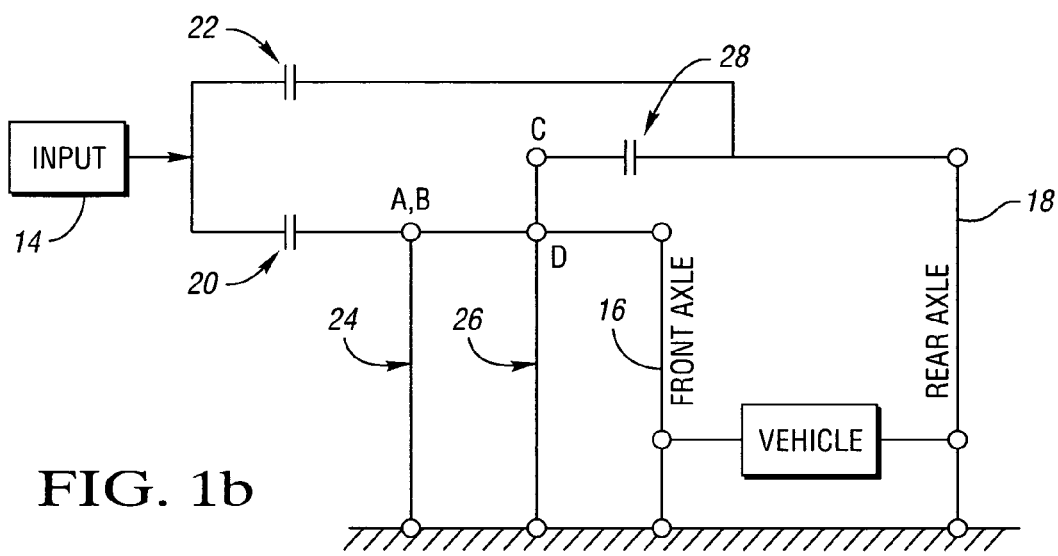
FIG. 1b
|  | HI (20) | LO (22) | 4WD (28) |
|---|---|---|---|
| FWD HI | X |  |  |
| RWD LO |  | X |  |
| 4WD HI | X |  | X |
| 4WD LO |  | X | X |
FIG. 1c

TWO SPEED TRANSFER CASE HAVING TWO TRANSFER CHAINS

TECHNICAL FIELD

The present invention relates to a transfer case including two transfer chains to provide rear wheel drive low, front wheel drive high, four wheel drive low, and four wheel drive high ratios.

BACKGROUND OF THE INVENTION

Four wheel drive (4WD) vehicles provide traction which is often unattainable in two wheel drive (2WD) vehicles by delivering power to both of the vehicle's axles. Attendant with the added traction provided by four wheel drive is the added complexity of the drive train required to control and deliver power to all four wheels as opposed to only two wheels. Four wheel drive characteristically does not have a center differential which would maintain a fixed fraction of torque delivered to each axle, but rather maintains the same speed at each axle regardless of the torque split between the two axles. The delivery of power between the front wheels and the rear wheels of the vehicle is typically handled by a transfer case mechanism which usually includes either a mechanically or electronically controlled clutch to switch between rear wheel drive and four wheel drive.

In all wheel drive (AWD) systems, the front and rear axles are continually in driving engagement with the transfer case, but the system contains a center differential to maintain a fixed ratio of torque between the front and rear axle.

In addition to controlling the transfer of torque between front and rear axles of a vehicle, the transfer case may also include a planetary gear set or set of countershaft gears which provides an underdrive or overdrive ratio. Further, rather than manufacturing a new five or six speed transmission, an existing four speed transmission may be used with a multi-speed transfer case to provide additional speed ratios, such as for stump pulling (extreme underdrive), or in a top gear—overdrive condition.

All wheel drive transfer cases typically contain a planetary gear set to provide the center differential function that maintains a constant torque split between the front and rear axle independent of tire speed or slip. The vehicle is also typically equipped with identical front and rear axle ratios and identical front and rear tire rolling radii in order to minimize the power (torque related losses) circulated in the center differential.

SUMMARY OF THE INVENTION

The present invention provides a low cost transfer case which provides two effective axle ratios by using two transfer chains having different chain ratios and three dog clutches. The transfer case is characterized by the absence of a planetary gear set.

More specifically, the invention provides a transfer case for a vehicle having front and rear axles. The transfer case includes first and second input clutches connected with an input member. First and second transfer chains having different transfer chain ratios are operatively connectable between the input member and the front and rear axles. A four wheel drive clutch is connected between one of the transfer chains and one of the axles. The first and second input clutches and the four wheel drive clutch are selectively engageable to provide a two wheel drive high ratio, a two wheel drive low ratio, a four wheel drive high ratio, and a four wheel drive low ratio.

In one embodiment, the front and rear axle ratios are different, the first input clutch selectively connects the input member with the first chain for driving the front axle. The second input clutch selectively connects the input member with the rear axle. The four wheel drive clutch is connected with the second transfer chain and the rear axle for selectively connecting the front and rear axles. The first and second transfer chains may both be in driving engagement with the front axle.

The first transfer chain may have a chain ratio which is less than the chain ratio of the second chain to accommodate a rear axle ratio greater than the front axle ratio. Alternatively, the first chain may have a chain ratio which is greater than the chain ratio of the second chain to accommodate a front axle ratio which is greater than the rear axle ratio. In any case, the product of the two chain ratios (in series) must be equal to the rear axle torque ratio divided by the front axle torque ratio.

In another embodiment, the vehicle has identical front and rear axle ratios, the first input clutch selectively connects the input member with the first and second transfer chains for driving the rear axle, the second input clutch selectively connects the input member with the rear axle for directly driving the rear axle, and the four wheel drive clutch selectively connects the first and second transfer chains with the front axle. In this embodiment, the second chain must have a 1:1 ratio and the output sprocket is in direct driving engagement with the rear axle.

The first and second input clutches and the four wheel drive clutch may be dog clutches.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1a shows a schematic stick diagram of a drive train in accordance with the invention;

FIG. 1b shows a lever diagram corresponding with the stick diagram of FIG. 1a;

FIG. 1c shows a truth table corresponding with FIGS. 1a and b;

FIG. 2b shows a lever diagram corresponding with FIG. 2a.

DESCRIPTION OF THE PREFERRED EMBODIMENTS

Figure 2A:
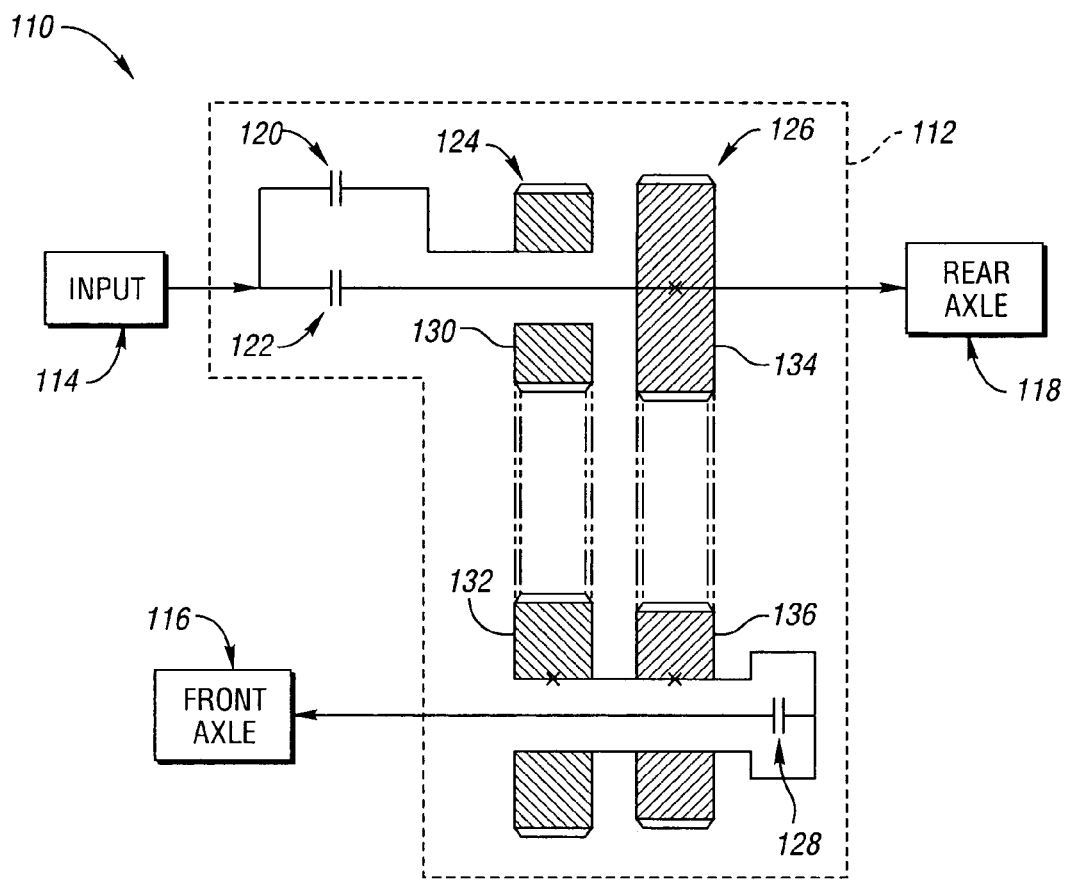
FIG. 2a shows a schematic stick diagram of a powertrain incorporating a transfer case in accordance with an alternative embodiment of the invention.

Referring to FIGS. 1a–c, a stick diagram, lever diagram and truth table are shown, respectively, illustrating a drive train 10 for a vehicle incorporating a transfer case 12 for receiving torque from an input 14, which receives torque from a transmission, and distributing the torque between the front and rear axles 16, 18 of the drive train 10. Preferably, the front and rear axles have different axle ratios. The "axle ratio" is the relationship between the vehicle's driveshaft (or propeller shaft) and its wheel axle. For instance, a 4:1 or 4.0 axle ratio means that the driveshaft turns four times for every one time the axle turns. The higher the axle ratio, the greater force that can be applied to the drive wheels for tasks like towing up a grade or pulling a boat out of the water. With the present invention, for example, the front axle may have a ratio of 3.15 and the rear axle may have a ratio of 4.10. In the various embodiments described, the front and rear axle ratios may be interchanged by swapping the transfer chain ratios, as will be described herein below.

The transfer case 12 includes first and second input clutches 20, 22 which are connected to the input 14. First and second transfer chains 24, 26 having different chain ratios are operatively connectable between the input 14 and the front and rear axles 16, 18 to provide different input/output ratios through the transfer case 12. In the embodiment shown, the first transfer chain 24 has a 1:1 chain ratio, and the second transfer chain 26 has a 1.3:1 chain ratio (sprocket C turns faster than sprocket D). The first transfer chain 24 is connected to the first input clutch 20, and is in direct driving engagement with the front axle 16 (through a propeller shaft). The second transfer chain 26 is directly connected to the front axle 16 (through a propeller shaft) and to the first transfer chain 24.

A four wheel drive clutch 28 is operative to selectively connect the second transfer chain 26 with the rear axle 18.

The first and second input clutches 20, 22 and the four wheel drive clutch 28 are all preferably dog clutches. Sample dog clutches for use with the present invention are shown, for example, in U.S. Pat. No. 4,349,091, which is hereby incorporated by reference in its entirety.

Referring to the truth table of FIG. 1c, the front wheel drive high ratio is achieved by engaging the first input clutch 20. In this configuration, power flows from the input 14 through the clutch 20 to the first transfer chain 24, to the front axle 16.

The rear wheel drive low ratio is achieved by engaging the second input clutch 22 while the other clutches 20, 28 are disengaged. In this configuration, power flows from the input 14 through the clutch 22 directly to the rear axle 18.

The four wheel drive high ratio is achieved by engaging the clutches 20 and 28. In this configuration, power flows from the input 14 through the clutch 20 through the transfer chain 24 to the front axle 16, and back through the transfer chain 26 and through the four wheel drive clutch 28 to the rear axle 18.

The four wheel drive low ratio is achieved by engaging the clutches 22 and 28. In this configuration, power flows from the input 14 through the second input clutch 22 directly to the rear axle 18, and through the four wheel drive clutch 28 and transfer chain 26 to the front axle 16.

The chain ratio of the second chain 26 must be equal to the rear axle torque ratio divided by the front axle torque ratio to avoid a tie-up in the wheels. The chain ratio for the first chain 24 is 1:1, and the second chain 26 has a 1.3:1 underdrive ratio (sprocket C turns faster than sprocket D). The combination of the front axle torque ratio times the first transfer chain ratio should be numerically lower (more overdrive) than the rear axle torque ratio. This will provide maximum fuel economy in front wheel drive mode.

Accordingly, this embodiment provides two effective axle ratios with the two transfer chains 24, 26 having different axle ratios, and the three dog clutches 20, 22, 28, without a planetary gear set. The transfer case will be able to shift "on the fly" from rear wheel drive low to four wheel drive low, and front wheel drive high to four wheel drive high if a synchronizer is used on the four wheel drive dog clutch 28. It will be necessary to come a complete stop to shift from low to high, unless the shift is made at zero torque with the engine speed controlled to match the oncoming gear synchronous speed.

As stated above, the second chain torque ratio must be equal to the rear axle torque ratio divided by the front axle torque ratio to avoid a tie-up in the wheels. In the configuration shown in FIG. 1a, the first sprocket member 30 turns 1.3 times for every one turn of the second sprocket member 32, to result in a 1.30 underdrive ratio. Accordingly, the rear axle ratio divided by the front axle ratio is equal to the tooth count of the second sprocket member 32 divided by the tooth count of the first sprocket member 30. Because the rear axle ratio is 4.10 and the front axle ratio is 3.15, the ratio of the second transfer chain 26 must be 1.30 underdrive, as stated above.

In another embodiment, if the rear axle ratio is 3.15, and the front axle ratio is 4.10, then the transfer chain 26 must provide a 1.30 overdrive ratio (i.e., the second sprocket member 32 would turn 1.3 times for every one rotation of the first sprocket member 30). This alternative embodiment would swap the functionality of the first and second input clutches 20, 22. The first input clutch 20 would be a front wheel drive low clutch, the second input clutch 22 would be a rear wheel drive high clutch, and the four wheel drive clutch 28 could be engaged with either of the other clutches 20, 22 to provide four wheel drive high or low.

Accordingly, if the front axle ratio is greater than the rear axle ratio, then the second chain 26 must have a first sprocket member with a greater tooth count than a second sprocket member which is directly driving the front axle (illustrated by the phantom first and second sprocket members 30', 32' shown in FIG. 1a). Alternatively, if the rear axle ratio is greater than the front axle ratio, then the second chain must have a first sprocket member with a tooth count smaller than the tooth count of the second sprocket member which is directly driving the front axle.

Thus, in the alternative embodiment, the rear axle torque ratio times the first transfer chain ratio is numerically lower (more overdrive) than the front axle torque ratio. This is done to achieve the maximum fuel economy in rear wheel drive mode because there are no chain losses.

Figure 2B:
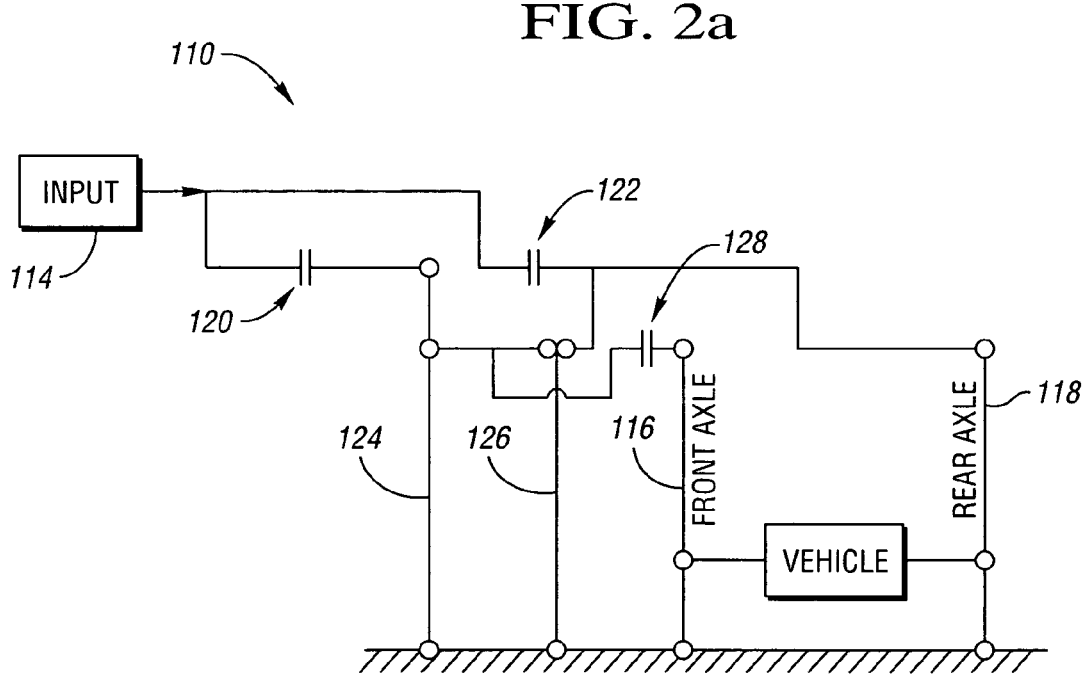

Turning to FIGS. 2a and 2b, a schematic stick diagram and lever diagram, respectfully, illustrate a powertrain 110 incorporating a transfer case 112 in accordance with an alternative embodiment of the invention. The transfer case 112 receives torque from an input 114 and distributes the torque between the front and rear axles 116, 118. This configuration includes first and second input clutches 120, 122 which are connected to the first and second transfer chains 124, 126, respectively. Also, a four wheel drive clutch 128 is provided to connect the front and rear axles 116, 118.

In this configuration, the front and rear axles have the same axle ratio, such as 3.15:1, for example. The first transfer chain 124 provides a 1.3:1 underdrive ratio. In other words, the first sprocket 130 turns 1.3 revolutions for every one revolution of the second sprocket 132. Accordingly, the tooth count of the second sprocket 132 divided by the tooth count of the first sprocket 130 equals 1.3. The second transfer chain 126 is a direct drive or 1:1 chain ratio device, so the sprockets 134, 136 of the second chain 126 are the same size.

The first sprocket 130 of the first chain 124 is directly connected with the first input clutch 120. The sprockets 132 and 136 are directly connected with the four wheel drive clutch 128. The sprocket 134 is in a direct driving engagement with the rear axle 118 through a propeller shaft (not shown).

A rear wheel drive low ratio is achieved by engaging the first input clutch 120. In this configuration, torque is transmitted from the input 114 through the clutch 120, through transfer chains 124 and 126, to the rear axle 118 via a propeller shaft. Accordingly, both chains 124, 126 are active.

In order to provide a rear wheel drive high ratio, the input clutch 122 is engaged, and the other clutches 120, 128 are disengaged. In this configuration, torque is transmitted from the input 114 through the input clutch 122 directly to the rear axle 118. In this configuration, the chains 124, 126 are not active.

To achieve a four wheel drive low ratio, the clutches 120 and 128 are engaged. In this configuration, torque is transmitted from the input 114 through the clutch 120 through the chain 124 to the clutch 128 and to the front axle 116. Torque is also carried from the transfer chain 124 to the transfer chain 126, and to the rear axle 118. Accordingly, both chains 124, 126 are active on the rear axle 118, and only chain 124 is active on the front axle.

In order to achieve a four wheel drive high mode, the clutches 122 and 128 are engaged. Accordingly, the rear axle 118 is directly driven by torque from the input 114 through the clutch 122. The front axle 116 is driven by the transfer chain 126 through the four wheel drive clutch 128.

Accordingly, in rear wheel drive low mode, both chains are active on the rear axle. In rear wheel drive high mode, neither chain is active axle. In four wheel drive low mode, the chain 124 is active on the front axle, and both chains are active on the rear axle. In four wheel drive high mode, the chain 126 is active on the front axle and neither chain is active on the rear axle.

By providing front and rear axles having the same ratios, and an underdrive ratio on the first transfer chain 124, maximum fuel economy is achieved in the rear wheel drive high mode because neither chain is active in rear wheel drive high.

As an alternative to the configuration shown in FIGS. 2a and 2b, the transfer chain 124 may be reconfigured as an overdrive chain, and the clutch 120 would become the high clutch, and the clutch 122 would become the low clutch. All other engagements would be the same. In this configuration, rear wheel drive low would be achieved by engaging the clutch 122, rear wheel drive high would be achieved by engaging the clutch 120, four wheel drive low would be achieved by engaging the clutches 122 and 128, and four wheel drive high would be achieved by engaging the clutches 120 and 128.

While the best modes for carrying out the invention have been described in detail, those familiar with the art to which this invention relates will recognize various alternative designs and embodiments for practicing the invention within the scope of the appended claims.

The invention claimed is:

1. A transfer case for a vehicle having front and rear axles, the transfer case comprising:
   first and second input clutches directly connected with an input member which carries torque into the transfer case;
   first and second transfer chains having different chain ratios operatively connectable between said input member and the front and rear axles; and
   a four wheel drive clutch operatively connected between one of said transfer chains and one of the axles;
   wherein said first and second input clutches and said four wheel drive clutch are selectively engageable to provide a two wheel drive high ratio, a two wheel drive low ratio, a four wheel drive high ratio, and a four wheel drive low ratio.

2. The transfer case of claim 1, wherein said first input clutch selectively connects said input member with said first chain for driving the front axle, said second input clutch selectively connects said input member with the rear axle, and said four wheel drive clutch is connected with the second transfer chain for selectively connecting the front and rear axles.

3. The transfer case of claim 2, wherein said first and second transfer chains are both in driving engagement with the front axle.

4. The transfer case of claim 3, wherein said second chain has a first sprocket member having a smaller tooth count than a second sprocket member which is directly driving the front axle, thereby accommodating a rear axle ratio greater than a front axle ratio.

5. The transfer case of claim 3, wherein said second chain has a first sprocket member having a tooth count greater than the tooth count of a second sprocket member which is directly driving the front axle, thereby accommodating a front axle ratio greater than a rear axle ratio.

6. The transfer case of claim 3, wherein said first input clutch selectively connects said input member with said first and second transfer chains for driving the rear axle, said second input clutch selectively connects said input member with the rear axle for directly driving the rear axle, and said four wheel drive clutch selectively connects the first and second transfer chains with the front axle.

7. The transfer case of claim 6, wherein said second chain is in driving engagement with the rear axle.

8. The transfer case of claim 1, wherein said first and second input clutches and said four wheel drive clutch comprise dog clutches.

9. A drive train for a vehicle comprising:
   front and rear axles; and
   a transfer case including:
   first and second input clutches connected with an input member;
   first and second transfer chains having different chain ratios operatively connectable between said input member and the front and rear axles; and
   a four wheel drive clutch operatively connected between one of said transfer chains and one of the axles;
   wherein said first and second input clutches and said four wheel drive clutch are selectively engageable to provide a two wheel drive high ratio, a two wheel drive low ratio, a four wheel drive high ratio, and a four wheel drive low ratio, wherein power flows through both of said transfer chains simultaneously in at least one of said two-wheel drive and four-wheel drive ratios.

10. The drive train of claim 9, wherein said first input clutch selectively connects said input member with said first chain for driving the front axle, said second input clutch selectively connects said input member with the rear axle, and said four wheel drive clutch is connected with the second transfer chain for selectively connecting the front and rear axles.

11. The drive train of claim 10, wherein said first and second transfer chains are both in driving engagement with the front axle.

12. The drive train of claim 11, wherein said second chain has a first sprocket member having a smaller tooth count than a second sprocket member which is directly driving the front axle, thereby accommodating a rear axle ratio greater than a front axle ratio.

13. The drive train of claim 11, wherein said second chain has a first sprocket member having a tooth count greater than the tooth count of a second sprocket member which is directly driving the front axle, thereby accommodating a front axle ratio greater than a rear axle ratio.

14. The drive train of claim 11, wherein said first input clutch selectively connects said input member with said first and second transfer chains for driving the rear axle, said second input clutch selectively connects said input member with the rear axle for directly driving the rear axle, and said four wheel drive clutch selectively connects the first and second transfer chains with the front axle.

15. The drive train of claim 14, wherein said second chain is in driving engagement with the rear axle.

16. The drive train of claim 9, wherein said first and second input clutches and said four wheel drive clutch comprise dog clutches.

17. The drive train of claim 9, wherein the transfer case is characterized by the absence of a planetary gear set.

18. A transfer case for a vehicle having front and rear axles, the transfer case comprising:
- first and second input clutches connected with an input member;
- first and second transfer chains having different chain ratios operatively connectable between said input member and the front and rear axles; and
- a four wheel drive clutch operatively connected between one of said transfer chains and one of the axles;
- wherein said first and second input clutches and said four wheel drive clutch are selectively engageable to provide a two wheel drive high ratio, a two wheel drive low ratio, a four wheel drive high ratio, and a four wheel drive low ratio;
- wherein said first input clutch selectively connects said input member with said first chain for driving the front axle, said second input clutch selectively connects said input member with the rear axle, and said four wheel drive clutch is connected with the second transfer chain for selectively connecting the front and rear axles;
- wherein said first and second transfer chains are both in driving engagement with the front axle; and
- wherein said second chain has a first sprocket member having a smaller tooth count than a second sprocket member which is directly driving the front axle, thereby accommodating a rear axle ratio greater than a front axle ratio.

19. The transfer case of claim 18, wherein the transfer case is characterized by the absence of a planetary gear set.

* * * * *